US009314143B2

United States Patent
Bensussan et al.

(10) Patent No.: US 9,314,143 B2
(45) Date of Patent: Apr. 19, 2016

(54) CLEANING SYSTEMS WITH BUCKETS AND REMOVABLE DIVIDERS

(71) Applicant: Unger Marketing International LLC, Bridgeport, CT (US)

(72) Inventors: Bernard Leon Bensussan, Monroe, CT (US); Joesph K. Patterson, Monroe, CT (US); QinXue Zhou, SuZhou (CN)

(73) Assignee: Unger Marketing International, LLC, Bridgeport, CT (US)

( * ) Notice: Subject to any disclaimer, the term of this patent is extended or adjusted under 35 U.S.C. 154(b) by 0 days.

(21) Appl. No.: 14/166,184

(22) Filed: Jan. 28, 2014

(65) Prior Publication Data

US 2015/0210429 A1    Jul. 30, 2015

(51) Int. Cl.
| | | |
|---|---|---|
| *B65D 25/04* | (2006.01) | |
| *A47L 13/50* | (2006.01) | |
| *F16J 15/02* | (2006.01) | |
| *A47L 13/51* | (2006.01) | |

(52) U.S. Cl.
CPC .............. *A47L 13/50* (2013.01); *A47L 13/51* (2013.01); *B65D 25/04* (2013.01); *F16J 15/022* (2013.01); *F16J 15/025* (2013.01); *F16J 15/028* (2013.01)

(58) Field of Classification Search
CPC .. B65D 25/04; B65D 25/06; A47B 2088/202; B44D 3/122; B65F 1/004; B65F 1/0046; B65F 1/04; B65F 1/08
USPC ......... 220/532, 575, 564, 544, 543, 530, 529, 220/510, 720–723
See application file for complete search history.

(56) References Cited

U.S. PATENT DOCUMENTS

| | | | |
|---|---|---|---|
| 166,102 A | 7/1875 | Hannaman | |
| 1,848,331 A | 3/1932 | Esslinger | |
| 4,301,942 A | 11/1981 | Kupperman | |
| 4,436,215 A | 3/1984 | Kleinert | |
| 4,577,773 A | 3/1986 | Bitel | |
| 4,838,445 A * | 6/1989 | Lanius .......................... | 220/533 |
| 5,082,139 A | 1/1992 | Quam | |
| 5,094,375 A | 3/1992 | Wright | |
| 5,615,797 A | 4/1997 | Ripamonti | |
| 5,676,241 A | 10/1997 | Degoix | |
| 6,851,566 B1 | 2/2005 | Bonner | |
| 7,083,064 B2 | 8/2006 | Zorzo | |
| 7,721,362 B2 | 5/2010 | Martin | |
| 7,946,445 B2 | 5/2011 | Tytar | |
| 7,984,820 B2 | 7/2011 | Dancyger | |
| 8,893,915 B2 * | 11/2014 | Vargas .......................... | 220/549 |
| 2002/0096525 A1 | 7/2002 | Bertoldo | |

(Continued)

FOREIGN PATENT DOCUMENTS

| | | |
|---|---|---|
| EP | 1382535 A1 | 1/2004 |
| EP | 1516575 A2 | 3/2005 |
| WO | 2007107681 A2 | 9/2007 |

*Primary Examiner* — Anthony Stashick
*Assistant Examiner* — Mollie Llewellyn
(74) *Attorney, Agent, or Firm* — Ohlandt, Greeley, Ruggiro & Perle, LLP (57) ABSTRACT

A cleaning system is provided that includes a bucket having a channel defined therein and a divider. The divider has a main body and a pair of sealing walls that extend from a periphery of the main body in such a manner that the sealing walls are separated from one another. Each of the sealing walls is configured to resiliently flex inwardly toward one another when the divider is in the channel to form a seal against the channel and divide the bucket into first and second reservoirs.

15 Claims, 9 Drawing Sheets

(56) References Cited

U.S. PATENT DOCUMENTS

2004/0007577 A1 1/2004 Zorzo
2006/0070202 A1 4/2006 Lauer
2008/0128428 A1 6/2008 Beckerman
2009/0057305 A1 3/2009 Moreau
2012/0228304 A1 9/2012 Rueckheim

* cited by examiner

CLEANING SYSTEMS WITH BUCKETS AND REMOVABLE DIVIDERS

BACKGROUND OF THE INVENTION

1. Field of the Invention

The present disclosure is related to cleaning systems. More particularly, the present disclosure is related to cleaning systems with buckets having removable dividers.

2. Description of Related Art

Cleaning systems that use, in part, buckets are known. For example, cleaning systems with buckets have been widely used for mopping and cleaning for many years. Some prior art buckets have a divider which partitions the bucket into two liquid reservoirs. In use, the first reservoir serves as a source of clean water or solution, while the second reservoir serves as a source for soiled water or solution from the cleaning implement. When used in mopping activities, a mop press is typically positioned at the second or soiled solution reservoir, so that solution pressed from the mop drains into the second reservoir.

While it is desired in some situations for the bucket to be used in this divided state, there are also other situations where it may be desired to use the bucket without such a divider. Accordingly, some prior art buckets such as that described in EP1516575A2 have a removable divider. Unfortunately many such buckets with removable dividers have proven costly to manufacture and/or allow leaking of solutions between the two reservoirs.

Accordingly, it has been determined by the present disclosure there is a need for cleaning systems having buckets with removable dividers that overcome, alleviate, and/or mitigate one or more of the aforementioned and other deleterious effects of the prior art.

BRIEF SUMMARY OF THE INVENTION

A cleaning system including a bucket with a removable divider is provided that is easy to manufacture, yet mitigates instances of leaking between the divided reservoirs.

A cleaning system is provided that includes a bucket having a channel defined therein and a divider. The divider has a main body and a pair of sealing walls that extend from a periphery of the main body in such a manner that the sealing walls are separated from one another. Each of the sealing walls is configured to resiliently flex inwardly toward one another when the divider is in the channel to form a seal against the channel and divide the bucket into first and second reservoirs.

In some embodiments, a cleaning system is provided that includes a bucket having a channel defined therein and a divider. The divider has a main body and at least one sealing wall that extends from a periphery of the main body. The sealing wall has an upper edge that is unsupported and is configured to resiliently flex when the divider is in the channel to form a seal against the channel and divide the bucket into first and second reservoirs.

In other embodiments, a cleaning system is provided that includes a bucket having a channel defined therein, a divider having a main body having a periphery, and a pair of sealing walls that extend from the periphery around three sides of the main body. Each sealing wall has an elbow region connected to the main body and a region that extends generally parallel to the main body so that the sealing walls are separated from one another. The sealing walls resiliently flexing inwardly toward the one another when the divider is in the channel to form a seal against the channel and divide the bucket into first and second reservoirs.

The above-described and other features and advantages of the present disclosure will be appreciated and understood by those skilled in the art from the following detailed description, drawings, and appended claims.

DETAILED DESCRIPTION OF THE INVENTION

Figure 1:
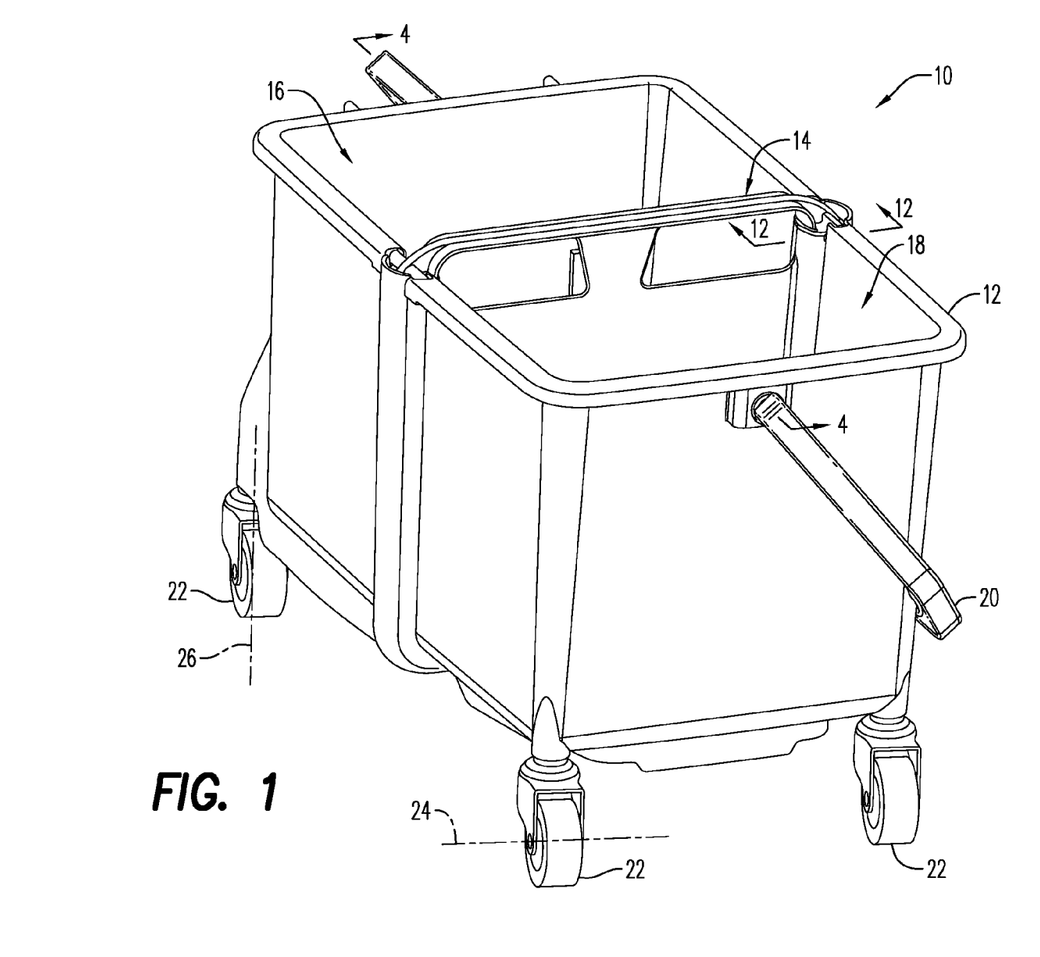
FIG. 1 is a top perspective view of an exemplary embodiment of cleaning system having a bucket and a divider according to the present disclosure.
Figure 2:
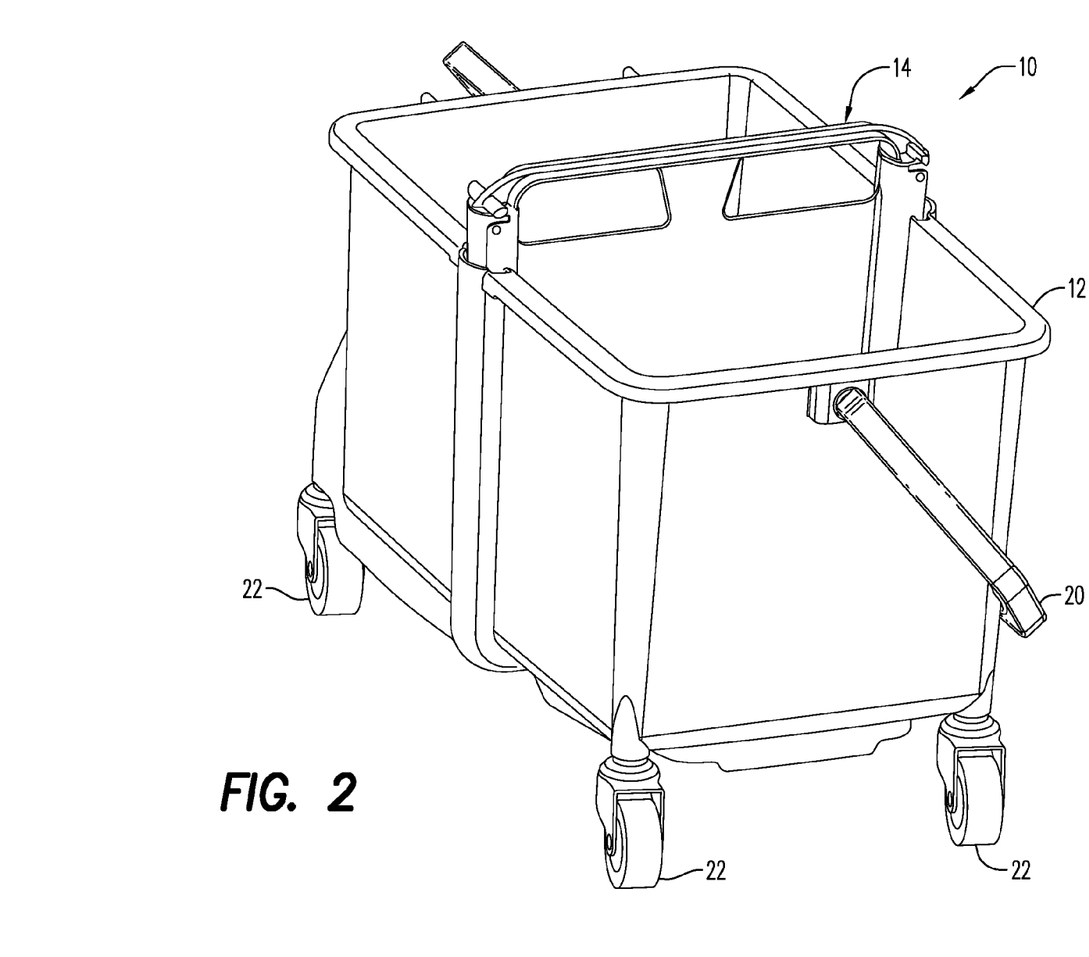
FIG. 2 is a top perspective view of the system of FIG. 1 illustrating the divider in a position that is partially withdrawn from the bucket.

Referring to the drawings and in particular to FIGS. 1 and 2, a cleaning system, according to the present disclosure is shown and is generally referred to by reference numeral 10.

Advantageously, system 10 includes a bucket 12 that is configured for use with a divider 14, which can easily by installed (FIG. 1) and removed (FIG. 3) from the bucket. When installed, divider 14 separates bucket 12 into first and second reservoirs 16, 18 and mitigates leakage of water or cleaning solution between the reservoirs.

System 10 is illustrated for ease of discussion having bucket 12 configured for use with a single divider 14. Of course, it is contemplated by the present disclosure for system 10 to have a bucket 12 that finds use with more than one divider 14 to separate the bucket into any desired number of different reservoirs.

System 10 can include a handle 20 that allows bucket 12 to be lifted or moved by the user. Handle 20 can be pivotally mounted to bucket 12 so that it can be moved from a non-use position as in FIG. 1 to a carrying position (not shown) where the handle projects vertically upward above reservoirs 16, 18.

Additionally, system 10 can include a plurality of wheels 22 depending from bucket 12, which allow the bucket to be easily moved across a surface. Wheels 22 preferably rotate about two axes 24, 26 to allow freedom of movement of bucket.

The sealing interaction between bucket 12 and divider 14 is described with simultaneous reference to FIGS. 3 through 9.

Figure 3:
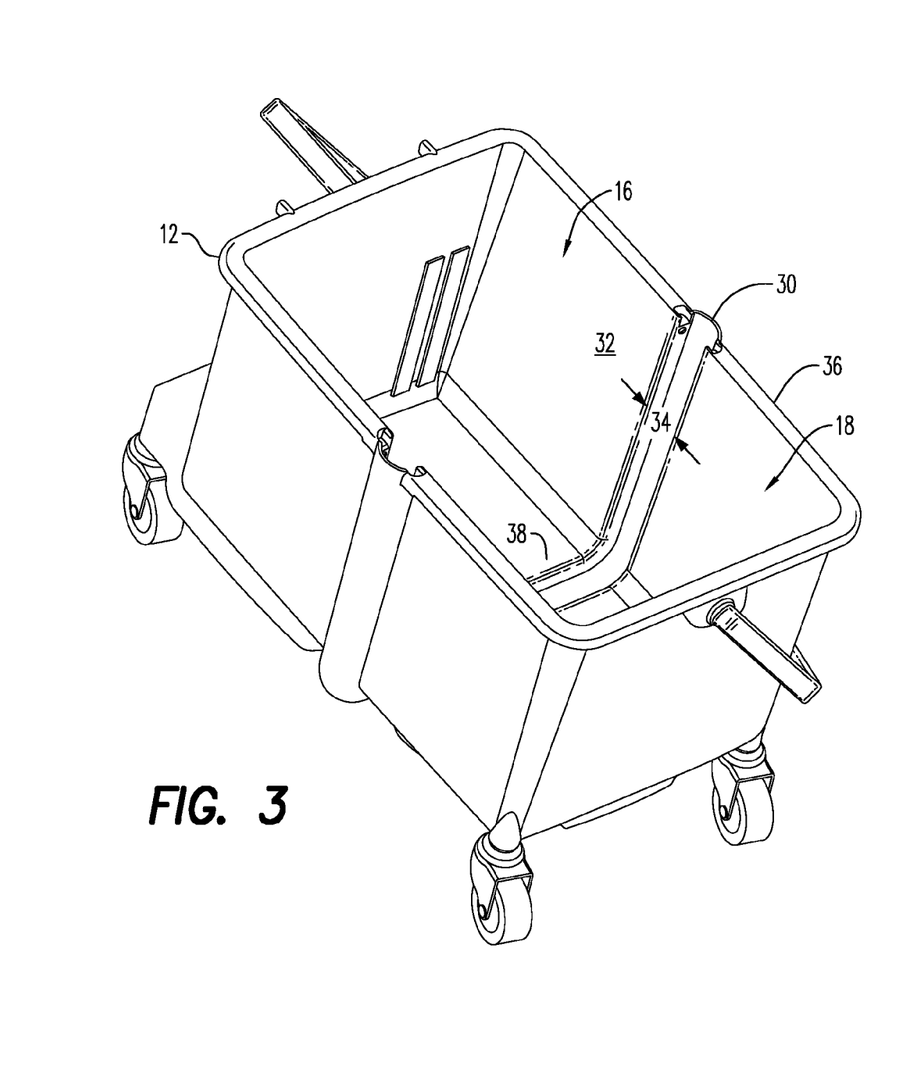
FIG. 3 is a top perspective view of the bucket of FIG. 1 with the divider removed.
Figure 4:
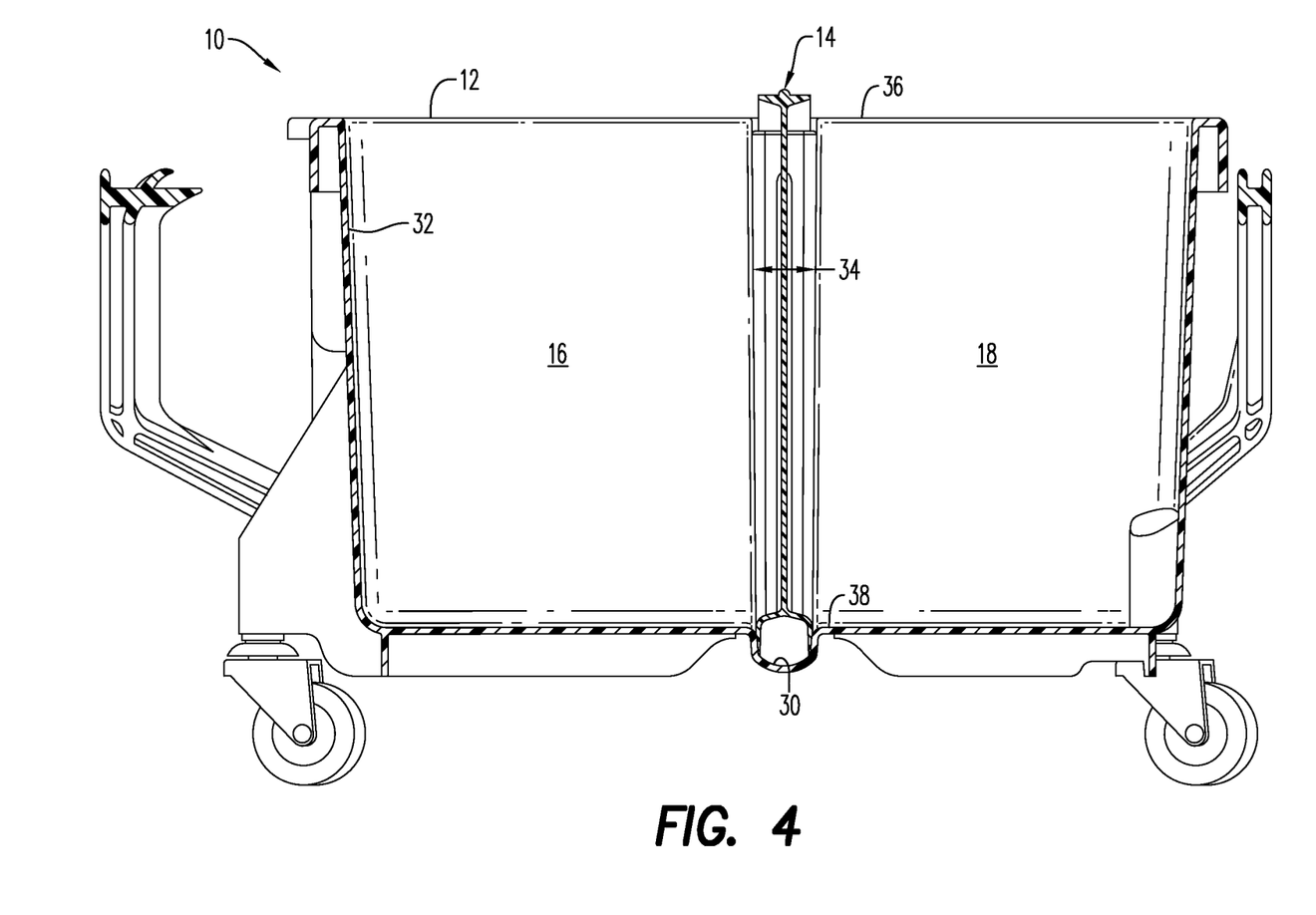
FIG. 4 is a sectional view of the bucket and divider of FIG. 1.
Figure 5:
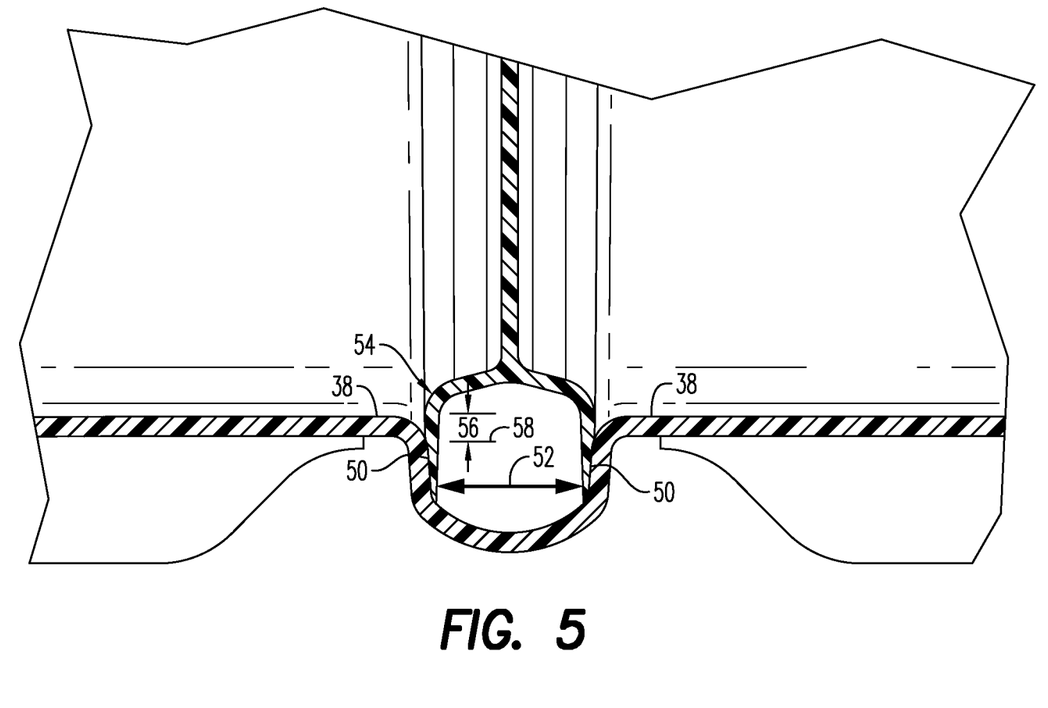
FIG. 5 is a magnified view of the sectional view of FIG. 4.
Figure 6:
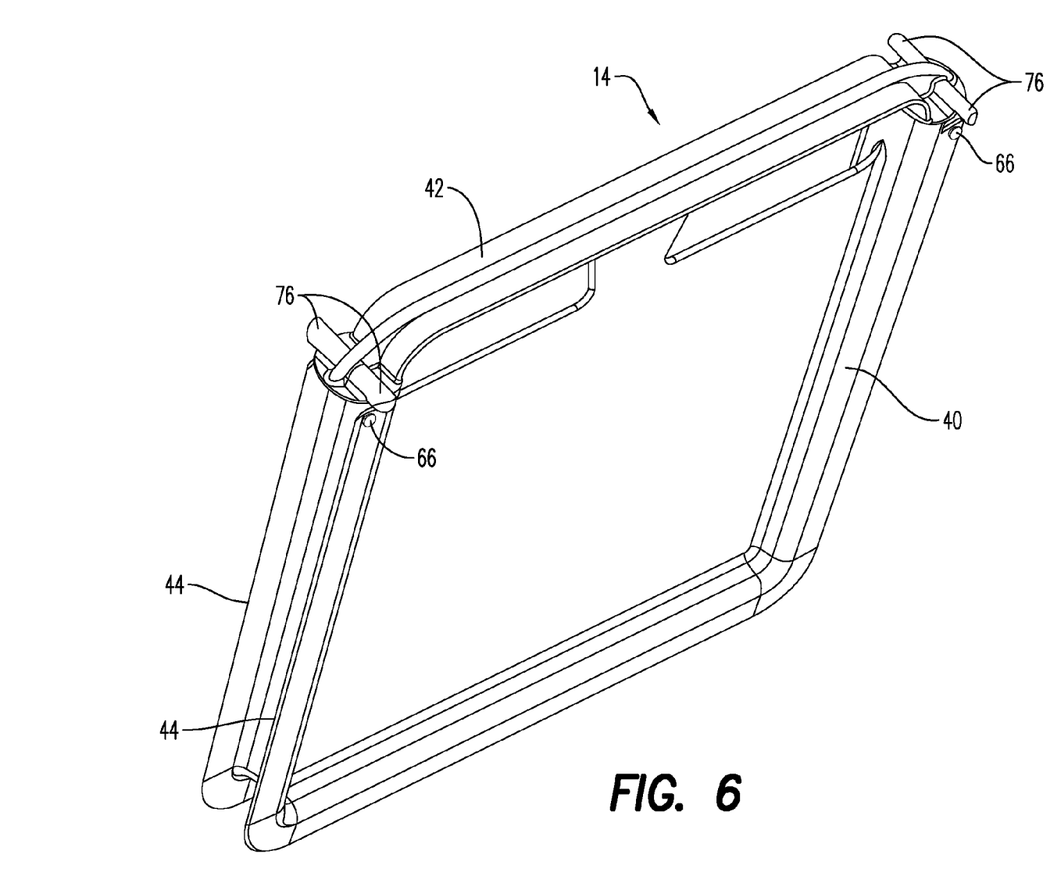
FIG. 6 is a top perspective view of the divider of FIG. 4.
Figure 7:
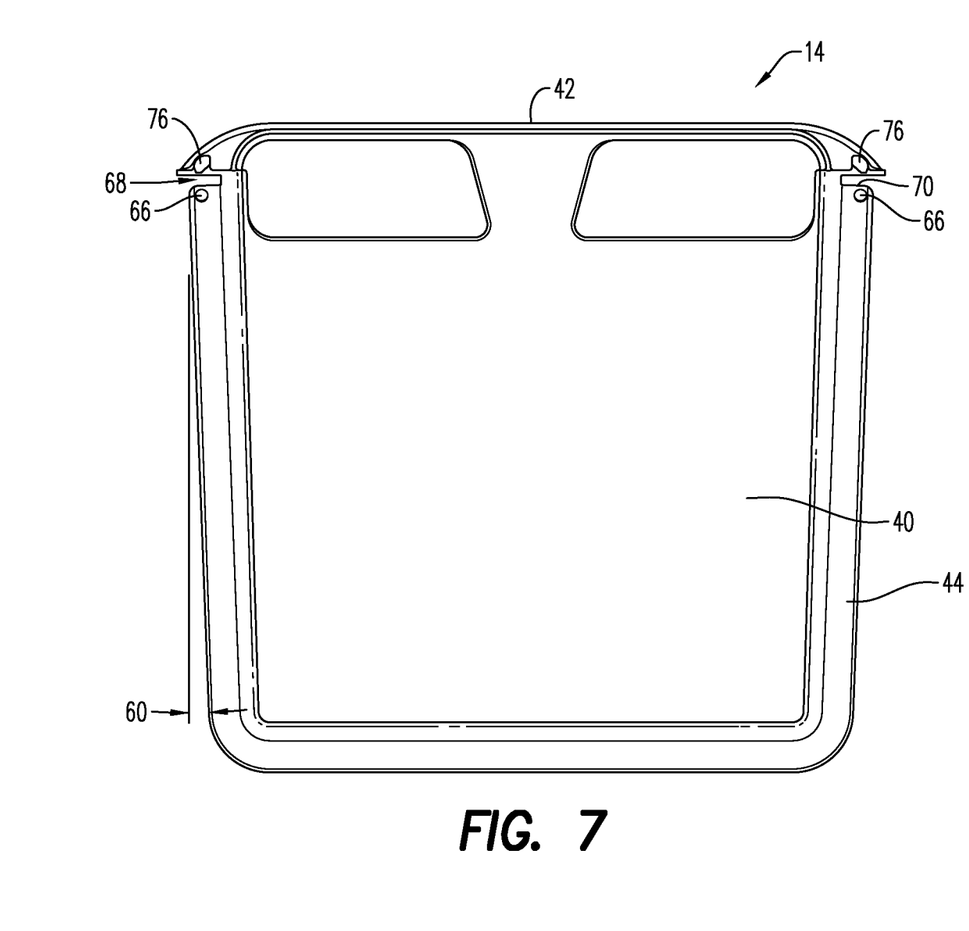
FIG. 7 is a side view of the divider of FIG. 4.
Figure 8:
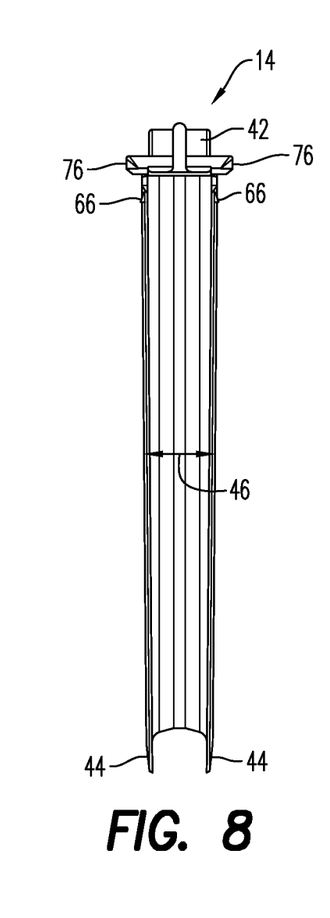
FIG. 8 is an end view of the divider of FIG. 4.
Figure 9:
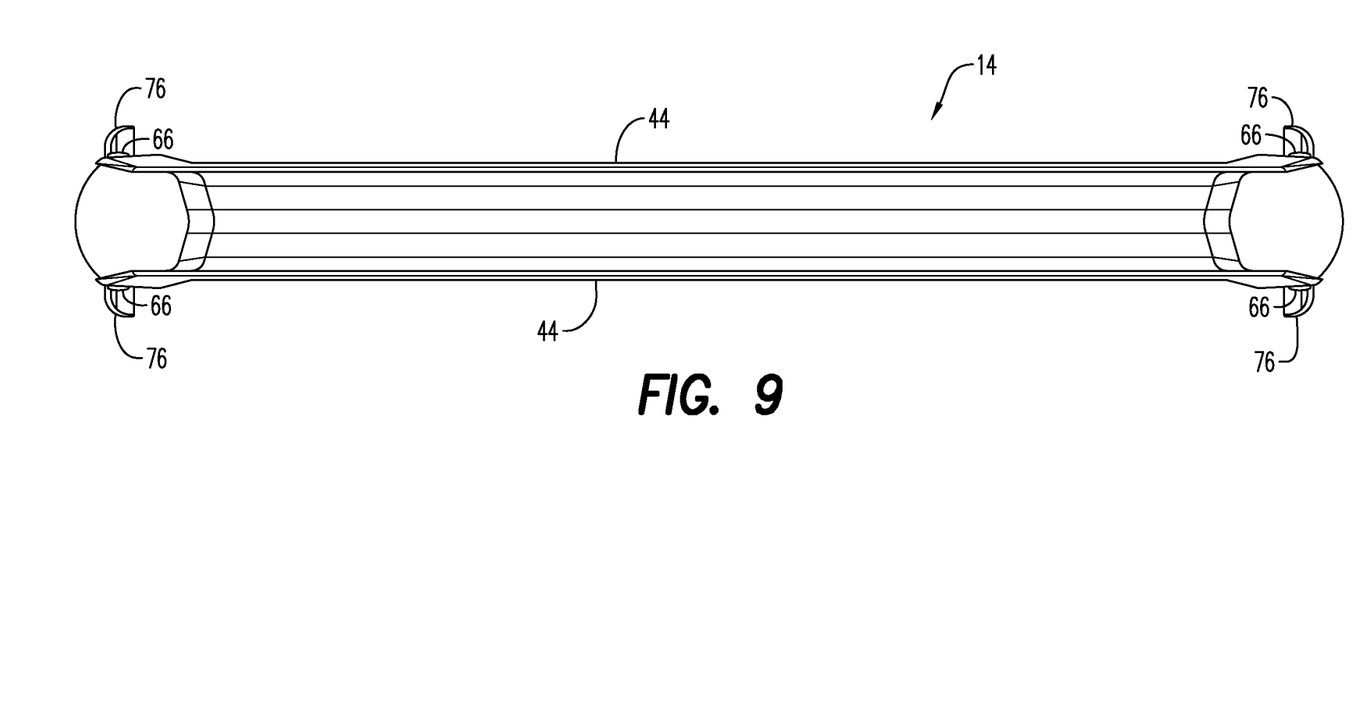
FIG. 9 is a bottom view of the divider of FIG. 4.

Bucket 12 includes a channel 30 integrally molded therein as shown in FIGS. 3 through 5. Channel 30 is recessed with respect to or below a surface 32 of reservoirs 16, 18 and is configured for ease of cleaning.

For example, channel 30 can have a width 34 that is sufficient to allow a user to wipe the channel clean with a finger placed in a cleaning cloth. Thus in some embodiments, width 34 can be at least 0.50 inches, more preferably at least 0.75 inches, with about 1 inch being most preferred. In the illustrated embodiment, width 34 of channel tapers from a larger width at an upper edge 36 of bucket 12 to a bottom 38 of the bucket and has a substantially constant width along the bottom of the bucket.

Additionally, channel 30 can have a cross-section that is rounded to eliminate hard to clean locations or places where dirt can accumulate. For example, channel 30 can have a curved cross-section such as, but not limited to, a semicircular cross section.

It has been determined by the large, easy to clean channel 30 makes it difficult to provide divider 14 with the ability to prevent or mitigate leakage between reservoirs 16, 18.

Advantageously, bucket 12 and divider 14 are configured to provide a biased multi-surface seal that mitigates and, in many instances prevents leakage of fluids between reservoirs 16, 18. The seal between bucket 12 and divider 14 is best seen in FIGS. 4 and 5 and the details of the divider are best seen in FIGS. 6 through 9.

Divider 14 has a main body 40, a handle region 42, and a pair of sealing walls 44. The sealing walls 44 extend from a periphery of main body 40 around three sides of the main body in such a manner that the sealing walls are separated from one another and are generally parallel to the main body. Divider 14 is made of a material that allows sealing walls 44 to resiliently flex inwardly towards one another as described in more detail below.

Sealing walls 44 have an outer dimension 46 that is, before insertion into channel 30 of bucket 12, slightly larger than width 34 of the channel. In this manner, inserting divider 14 into bucket 12 results in channel 30 resiliently flexing or biasing walls 44 inward towards one another so that each wall forms an elongated seal 50 against a different region of the channel. Walls 44 have sufficient length, as long flexing members, that reduces the stresses and decreases the impact of creep resistance on the sealing. Moreover and in the event of damage to the flexing walls 44, divider 14 can simply be replaced without the need to replace bucket 12.

The resiliency of walls 44 applies a sealing force 52 outwardly against channel 30 while divider 14 is in channel 30, which assists in preventing fluid from leaking past elongated seal 50.

Additionally and without wishing to be bound by any particular theory, it is believed that the weight of fluid within reservoirs 16, 18 could act on walls 44 to overcome sealing force 52. However, system 10 has been configured so that the region of walls 44 that is above channel 30 has been minimized to lessen the effects of the weight of the fluid on elongated seal 50.

Specifically, walls 44 have an elbow region 54 where the walls are believed to resiliently flex with respect to main body 42. System 10 has been configured so that a distance 56 between an upper extent 58 of seal 50 and elbow region 54 is minimized.

Bucket 12 and divider 14 have a slight draft between their respective upper and lower edges. The vertical draft 60 of divider 14 can be seen in FIG. 7. Preferably, the draft of bucket 12 along the vertical portions of channel 30 is substantially the same as vertical draft 58.

As disclosed above, channel 30 and walls 44 are configured and dimensioned in the vertical, horizontal, and width directions to maintain resiliently biased elongated seal 50 around three sides of main body 42 to separate bucket 12 into reservoirs 16, 18.

Figure 10:
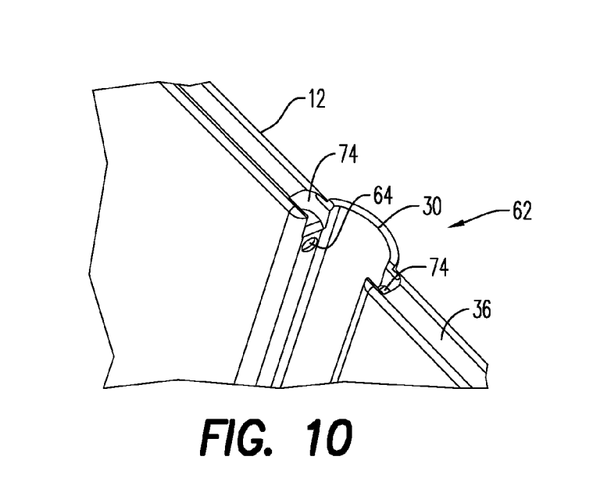
FIG. 10 is a magnified view of a bucket and divider connecting region of the bucket.
Figure 11:
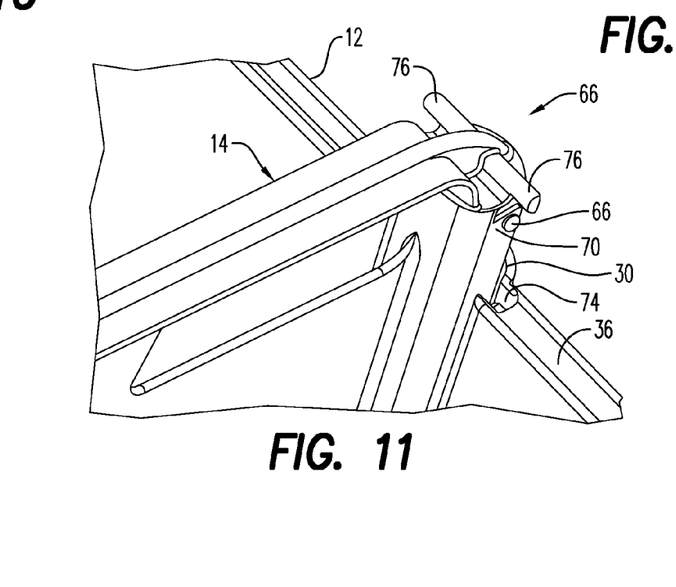
FIG. 11 is a magnified view of the connecting region as the divider is being installed.
Figure 12:
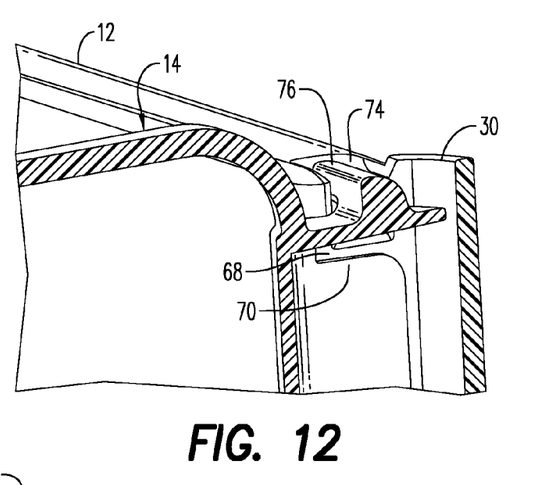
FIG. 12 is a magnified view of the connecting region after installation of the divider.

Referring now to FIGS. 10 through 12, two additional features of system 10 are shown. Specifically, system 10 includes a connecting region 62. In some embodiments, connecting region 62 removably secures divider 14 in bucket 12. In other embodiments, connecting region 62 allows divider 14 to function as a structural member to add hoop strength to upper edge 36 of bucket 12. In still other embodiments, connecting region 62 both removably secures divider 14 in bucket 12 and adds hoop strength to upper edge 36 of the bucket 12.

In embodiments where connecting region 62 removably secures divider 14 in bucket 12, system 10 includes an indentation or locking feature 64 defined in channel 30 at least on one side, but preferably on both sides. Additionally, system 10 includes a complementary protrusion or locking feature 66 defined on at least one wall 44, but preferably on both walls.

Walls 44 include a relief 68 defined at an upper edge 70 of the wall, where the upper edges of the wall are unsupported by handle region 42 or one another to allow the walls in the region of protrusion 66 to flex. Without wishing to be bound to any particular theory, it is believed that the unsupported upper edge 70 of walls 44—due to relief 68—allow the walls to flex and seal to bucket 12 in the manner described above. Moreover, it is also believed that flexion of walls 44 reduces the force necessary to insert divider 14 into bucket 12.

During installation of divider 14 into bucket 12, a downward force is applied to handle region 42 and, as the divider slides downward in channel 30, the interference between the channel and protrusion 66 causes the top portion of walls 44 having the protrusion to resiliently flex inwardly until protrusion 66 is within indentation 64, at which point the walls resiliently flex outward to maintain protrusion 66 in indentation 64. During removal of divider 14 from bucket 12, an upward force is applied to handle region 42 causes the top portion of walls 44 to resiliently flex inwardly until protrusion 66 is free from indentation 64 so that the divider can slide upward in channel 30.

Advantageously, the resilient flexing of walls 44 so that protrusion 66 are within indentation 64 provides a tactile and/or an audible indicator that divider 14 is properly seated within channel 30.

In embodiments where connecting region 62 allows divider 14 to functional as a structural member to add hoop strength to upper edge 36 of bucket 12, system 10 includes at least one indentation 74 in the upper edge and preferably two indentations as shown in FIG. 10. Additionally, system 10 includes at least one, but preferably two, complementary protrusion 76 depending from handle region 42.

The weight of fluid within reservoirs 16, 18 and/or forces applied to bucket 12 by a mop press (not shown) can act on the bucket to bow or deflect the upper edge 36 of the bucket outward. However, when divider 14 is inserted into bucket 12, protrusions 77 are removably received in indentations 74 as in FIG. 12 such that any forces on edge 36 tending to bow the edge outward are counteracted by divider 14, which acts as a structural member to add hoop strength to upper edge 36 of bucket 12. In some embodiments, bucket 12 is configured for use with the mop press as shown and described in Applicants' own U.S. Pat. No. 8,627,541, the contents of which are incorporated in their entirety herein by reference thereto.

Bucket 12, divider 14, and handle 20 can be formed of any material having sufficient strength, rigidity, and resiliency. In some embodiments, bucket 12, divider 14, and handle 20 are formed of polypropylene (PP).

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A cleaning system comprising:
    a bucket having a channel defined therein; and
    a divider having a main body and a pair of sealing walls that extend from a periphery of the main body in such a manner that the sealing walls are opposed to one another along a common region of the periphery,
    wherein each sealing wall of the pair of sealing walls is configured to resiliently flex to form a biased seal against a wall of the channel so as to divide the bucket into first and second reservoirs, wherein the biased seal prevents leakage of fluids between the first and second reservoirs.

2. The cleaning system of claim 1, wherein the channel has a width of at least 0.50 inches.

3. The cleaning system of claim 1, wherein the channel has a width of about 1 inch.

4. The cleaning system of claim 1, wherein the channel has width that tapers from a larger width at an upper edge of the bucket to a narrower width at a bottom of the bucket and has a substantially constant width along the bottom of the bucket.

5. The cleaning system of claim 1, wherein each sealing wall of the pair of sealing walls has an upper edge that is unsupported.

6. The cleaning system of claim 5, further comprising a locking indentation and a locking protrusion, the locking protrusion being defined on at least one sealing wall at the upper edge, the locking indentation being defined in the channel so as to removably receive the locking protrusion when the divider is in the channel.

7. The cleaning system of claim 1, wherein the bucket has an upper edge having an indentation defined therein and the divider has a complimentary protrusion, wherein the indentation receives the protrusion when the divider is in the channel so that the divider functions as a structural member to the bucket.

8. A cleaning system comprising:
    a bucket having a channel defined therein;
    a divider having a main body with a periphery; and
    a pair of sealing walls that extend from three sides of the periphery of the main body, each sealing wall having an elbow region connected to the main body and a region that extends generally parallel to the main body so that the sealing walls are separated from one another,
    the pair of sealing walls resiliently flexing to form biased seals against walls of the channel so as to divide the bucket into first and second reservoirs.

9. The cleaning system of claim 8, wherein each biased seal has an upper extent that is proximate the elbow region.

10. The cleaning system of claim 8, wherein the channel has a width of about 1 inch.

11. The cleaning system of claim 8, wherein the channel has a width that tapers from a larger width at an upper edge of the bucket to a narrower width at a bottom of the bucket and has a substantially constant width along the bottom of the bucket.

12. The cleaning system of claim 8, wherein each sealing wall of the pair of sealing walls has an upper edge that is unsupported.

13. The cleaning system of claim 12, further comprising a locking indentation and a locking protrusion, the locking protrusion being defined on at least one sealing wall at the upper edge, the locking indentation being defined in the channel so as to removably receive the locking protrusion when the divider is in the channel.

14. The cleaning system of claim 8, wherein the bucket has an upper edge having an indentation defined therein and the divider has a complimentary protrusion, wherein the indentation receives the protrusion when the divider is in the channel so that the divider functions as a structural member to the bucket.

15. The cleaning system of claim 8, wherein the biased seals prevent leakage of fluids between the first and second reservoirs.

\* \* \* \* \*

UNITED STATES PATENT AND TRADEMARK OFFICE
CERTIFICATE OF CORRECTION

PATENT NO.        : 9,314,143 B2
APPLICATION NO.   : 14/166184
DATED             : April 19, 2016
INVENTOR(S)       : Bensussan et al.

Page 1 of 1

It is certified that error appears in the above-identified patent and that said Letters Patent is hereby corrected as shown below:

ON THE TITLE PAGE

Item (72) - please correct: "Joesph K. Patterson" to -- Joseph K. Patterson -- and "QinXue Zhou" to -- QinXue Zhuo --.

Signed and Sealed this
Fourteenth Day of June, 2016

Michelle K. Lee
*Director of the United States Patent and Trademark Office*